(12) United States Patent
Heberling, II

(10) Patent No.: US 11,242,122 B2
(45) Date of Patent: Feb. 8, 2022

(54) INSERTABLE BLADDER SYSTEM FOR INFLATABLE BOAT REPAIR

(71) Applicant: Peter Stephen Heberling, II, Jacksonville, FL (US)

(72) Inventor: Peter Stephen Heberling, II, Jacksonville, FL (US)

(73) Assignee: Peter S Heberling, II, Jacksonville, FL (US)

(*) Notice: Subject to any disclaimer, the term of this patent is extended or adjusted under 35 U.S.C. 154(b) by 366 days.

(21) Appl. No.: 16/298,968

(22) Filed: Mar. 11, 2019

(65) Prior Publication Data
US 2019/0276118 A1 Sep. 12, 2019

Related U.S. Application Data

(60) Provisional application No. 62/641,405, filed on Mar. 12, 2018.

(51) Int. Cl.
*B63B 7/08* (2020.01)
*B60C 29/00* (2006.01)

(52) U.S. Cl.
CPC . *B63C 9/24* (2013.01); *B63B 7/08* (2013.01)

(58) Field of Classification Search
CPC .................................. B63B 7/08; B63C 9/24
See application file for complete search history.

(56) References Cited

U.S. PATENT DOCUMENTS

| | | | | |
|---|---|---|---|---|
| 2,413,869 A * | 1/1947 | Hamer | ............ | F16K 15/06 251/175 |
| 4,432,547 A * | 2/1984 | Richards | ............ | A63B 41/08 156/156 |
| 4,478,587 A * | 10/1984 | Mackal | ............ | F16K 15/20 441/41 |
| 4,927,397 A * | 5/1990 | Yeager | ............ | B63C 9/24 137/234 |
| 4,991,617 A * | 2/1991 | Butler | ............ | B63C 9/24 137/223 |
| 6,460,477 B1 * | 10/2002 | Hamilton | ............ | B63B 7/082 114/345 |
| 6,986,360 B2 * | 1/2006 | Chaffee | ............ | F16K 15/148 137/223 |
| 7,146,923 B2 * | 12/2006 | Polley | ............ | B63B 7/00 114/345 |
| 7,165,505 B2 * | 1/2007 | Franchetti | ............ | E04H 4/0025 114/345 |

(Continued)

*Primary Examiner* — S. Joseph Morano
*Assistant Examiner* — Jovon E Hayes

(57) ABSTRACT

A thin air bag/bladder, which when packaged and attached to an air valve system is inserted into an inflatable boat, or inflatable structure to repair a puncture or leak. This valve and adapter system is used to fasten and lock the valve structure in place during use. After attachment to the air valve system, the packaged bag is inserted into the inflatable structure with a collapsible tent pole/stick through the pre-existing valve opening with newly installed adapter. A valve system and bag/bladder will be needed for each separate air chamber of the boat design, whatever the length, diameter, or number of individual chambers. This will allow a replacement bag to be user retrofitted at any later time, whenever needed to repair a puncture or leakage, in any inflatable boat, life-raft or inflatable device.

39 Claims, 10 Drawing Sheets

(56) References Cited

U.S. PATENT DOCUMENTS

| | | | | |
|---|---|---|---|---|
| 7,275,494 | B2* | 10/2007 | Polley | B63C 9/24 |
| | | | | 114/345 |
| 7,438,081 | B1* | 10/2008 | Chen | F16K 15/20 |
| | | | | 137/223 |
| 8,162,009 | B2* | 4/2012 | Chaffee | A47C 31/008 |
| | | | | 141/10 |
| 8,667,982 | B2* | 3/2014 | Song | F16K 15/20 |
| | | | | 137/232 |
| 8,753,235 | B1* | 6/2014 | Daniel | A63B 41/00 |
| | | | | 473/603 |
| 9,022,051 | B2* | 5/2015 | Chaffee | F16K 15/20 |
| | | | | 137/15.01 |
| 9,505,334 | B2* | 11/2016 | Maness | F16K 15/20 |
| 2003/0028971 | A1* | 2/2003 | Chaffee | A47C 27/081 |
| | | | | 5/706 |
| 2019/0276118 | A1* | 9/2019 | Heberling, II | F16K 15/148 |

* cited by examiner

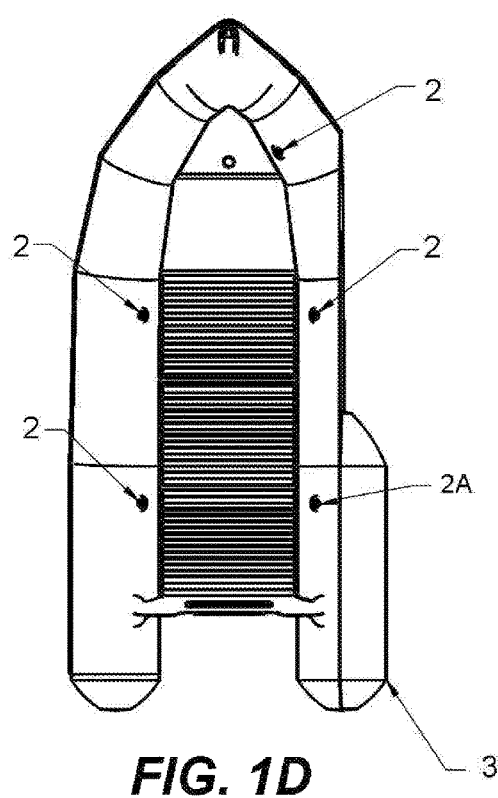
FIG. 1D
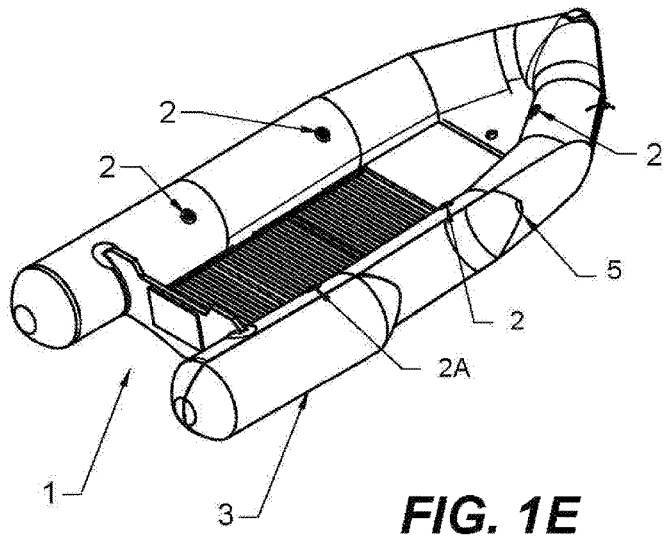
FIG. 1E
DETAIL A
FIG. 1H
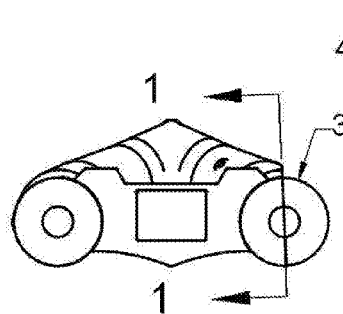
FIG. 1F
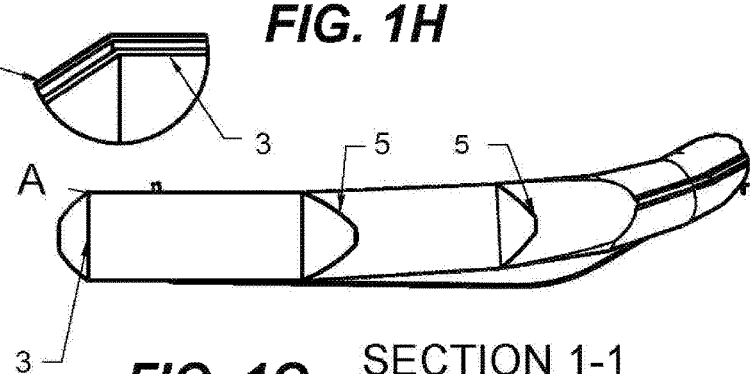
FIG. 1G   SECTION 1-1

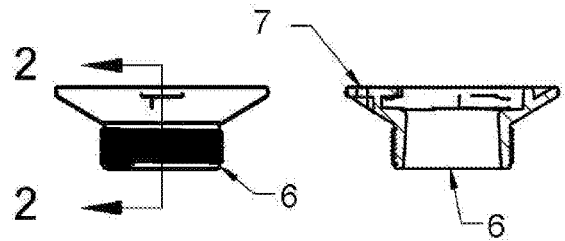
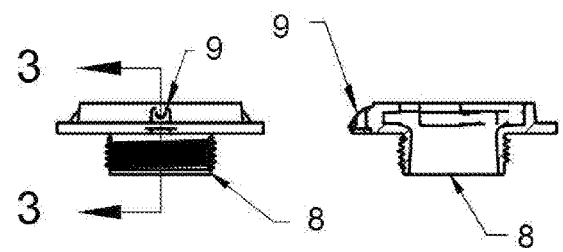
FIG. 2  FIG. 3  FIG. 4  FIG. 5
SECTION 2-2          SECTION 3-3
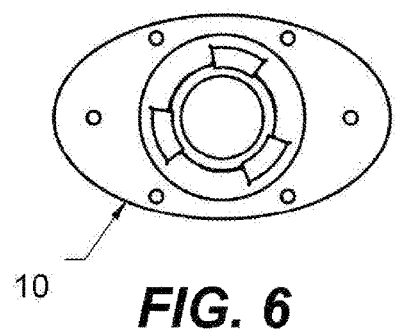
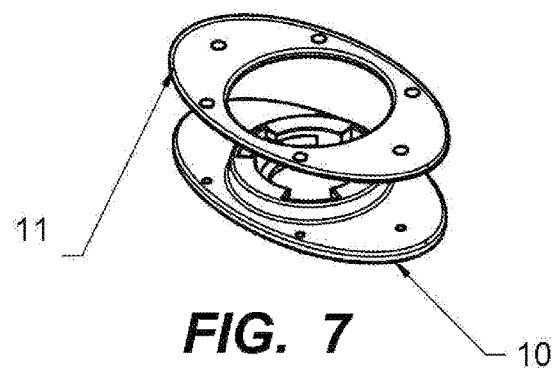
FIG. 6          FIG. 7
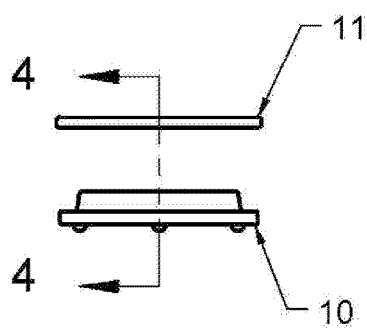
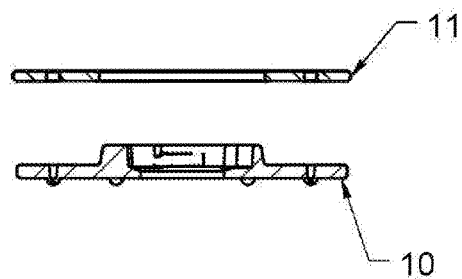
FIG. 8          FIG. 9
SECTION 4-4

SECTION 5-5

SECTION 6-6

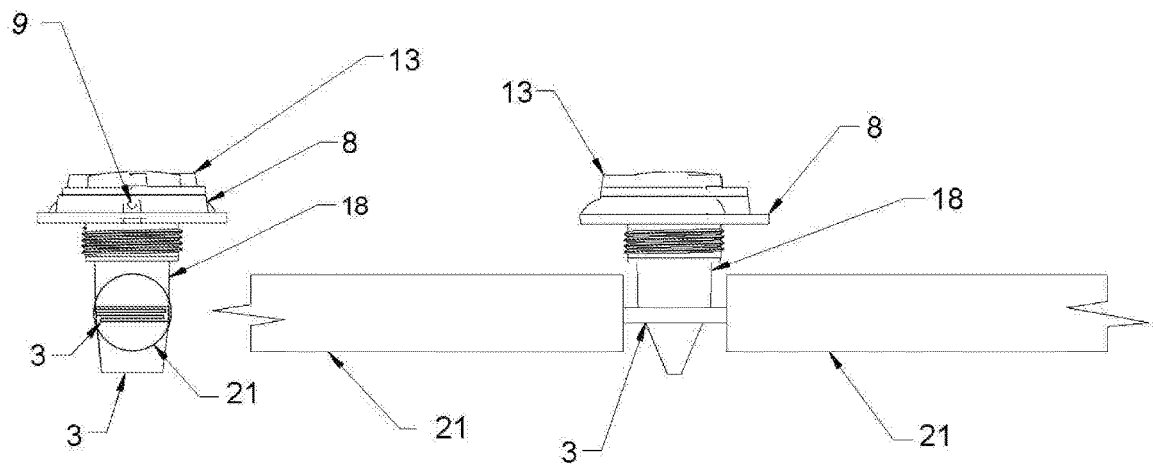
FIG. 15  FIG. 16
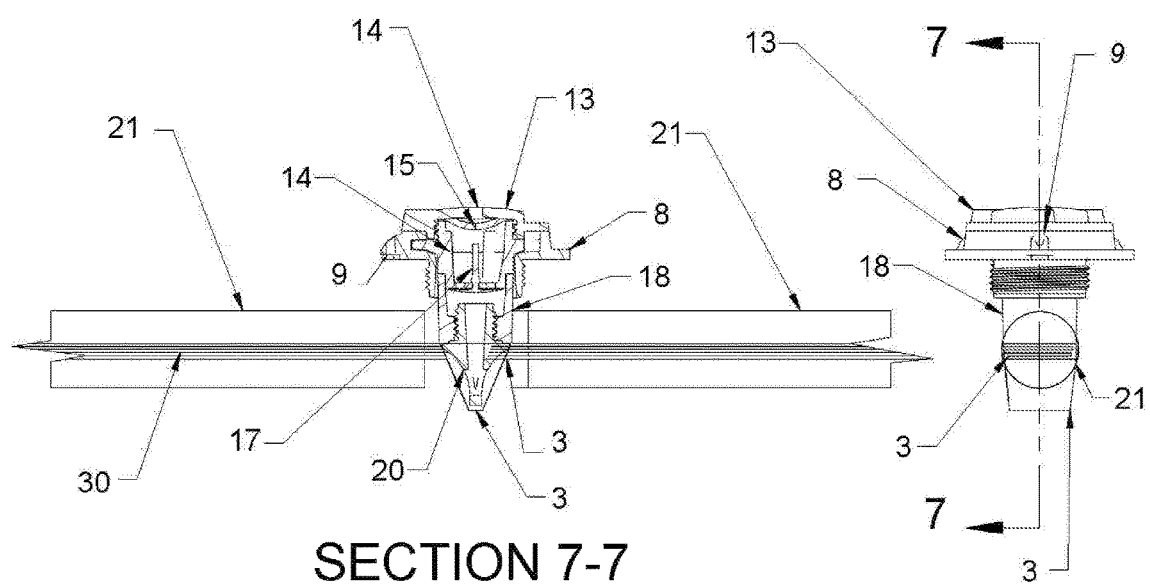
SECTION 7-7
FIG. 17  FIG. 18

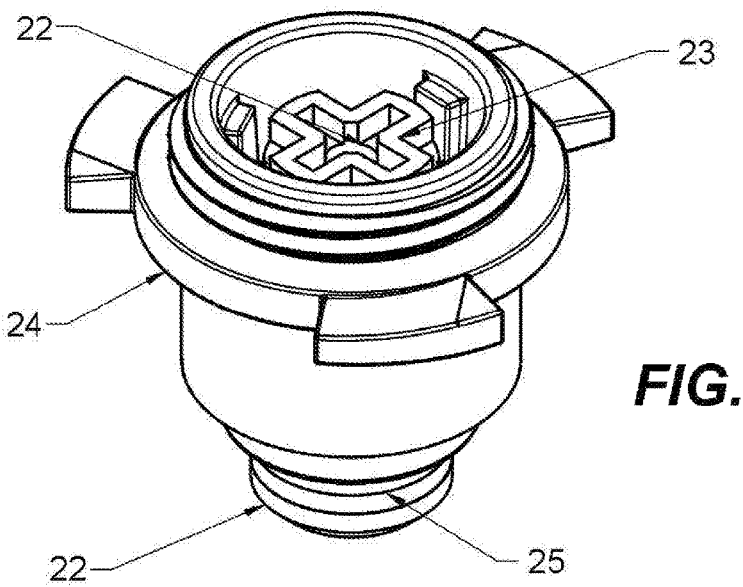
FIG. 19
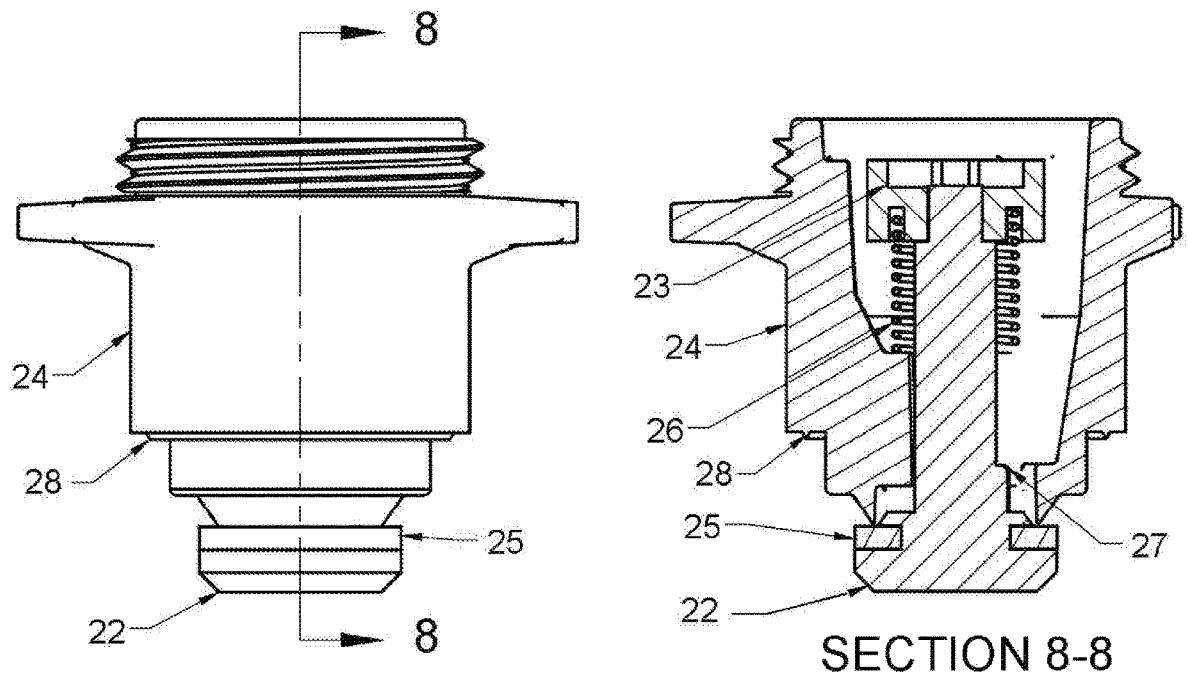
FIG. 20
FIG. 21

SECTION 9-9

INSERTABLE BLADDER SYSTEM FOR INFLATABLE BOAT REPAIR

CROSS-REFERENCE TO RELATED APPLICATIONS

This application claims the benefit and priority of U.S. Provisional Application Ser. No. 62/641,405 titled "A replaceable inflatable inner bag/bladder including replacement air valve with needed adapters, which will repair punctured or leaking inflatable boats or rafts, or other inflatable products that utilize various types of original equipment air valves at time of manufacture" 12 Mar. 2018, the same being incorporated herein by reference.

BACKGROUND OF THE INVENTION

Field of the Invention

The instant invention pertains generally to the repair of inflatable boats. More specifically, it teaches the use of replaceable inflatable inner bags/bladders including air valve systems and adapters, used to repair punctured or leaking inflatable boats, rafts, or other inflatable products.

BACKGROUND INFORMATION

Inflatable boats, rafts and many other inflatable products have the problem of leaking through normal use, wear and tear, and also from punctures or holes to the structure caused by the unforeseen and demanding conditions of ordinary use. This inflatable structure is most always a rubber covered reinforced fabric, which has necessary glued or welded seams to form the needed shapes for the intended purpose of the craft or object. The outer shell of reinforced fabric is not only the air holding bladder, but also provides the needed stiffness and structure of the craft. There are many different types of boats made in this way. Some types of rafts and boats get their shape from the inflated elements that form the desired hull shape. Still other types of raft use a rigid aluminum or fiberglass shaped hull bottom, with glued or attached inflatable collar around the perimeter, that are regarded as Rigid Inflatable Boats. Hence the term RIB, this is the generic term for this type of craft. There are also many more uses of this type construction, which include inflatable marine fenders, life rafts of many types and uses, and many other products that use these types of inflatable structures utilizing similar type air valves. Any future reference to this or any similar type of construction or product, the term boat, craft, or RIB will be substituted.

These types of inflatable craft are inherently difficult and expensive to manufacture, and repairing them when leaking or punctured is a tedious and expensive process. Even with the utmost care and attention during said repair of outer fabric, the results are usually less than expected and the repair will continue to, or eventually leak, even with a patch. This renders the boat less desirable as it must be constantly re-inflated or pumped up, to maintain the necessary flotation and or to provide the needed stiffness to the structure during use.

This invention is made for these very reasons, and addresses the problems with an advantageous solution to a patch for any air leak. If a leak or puncture occurs, the air tube of the RIB can then be user repaired without the hassle of a tedious or time-consuming repair.

SUMMARY OF THE INVENTION

The present invention encompasses a replaceable inflatable inner bladder/bag, reusable air valve system, and the selection of an adapter incorporated into this design, which is chosen depending on which type or make of air valve was originally installed in the inflatable product or boat, at the time of manufacture. There are many design types and choices of original equipment air valves used by manufacturers to make these inflatable products or boats.

The adapters in this invention are used to attach and hold tight the air valve system, including the attached bladder/bag, to the boat or inflatable product. This invention solves the issue of different air valve types used by manufacturer's, with an adapter which will screw into the previous air valves' threaded flange, or another design of adapter that will thread into the internal nut that secured the original air valve in its opening (as more completely described in U.S. Pat. No. 4,478,587). If the previous air valve design and opening is too small, or of a design that will not work in this situation, a third design of adapter, that is attached to the outer-skin or fabric with minimal alteration to boat, will therefore be used. The installation process of this adapter, will also allow for the removal of any previous air valve parts or the tightening nut left inside after disassembly, if applicable. Whichever of these adapters is needed and installed, these will allow the subsequent attachment, installation, and reattachment of this invention into any type of inflatable boat or product, for air leakage or repair of a puncture when needed in the future. The embodiments of this invention, allow the installation into any type or make of inflatable boat, raft, or similar inflatable products. Even though three different designs of adapters are listed and described in this disclosure, this does not preclude the subsequent design and manufacture of others, which may be included at a later date. The embodiments of all the described adapters included in this invention, is they all have the same internal features and size, to allow either air-valve system described in this invention, to be used interchangeably with whichever adapter is used at the time of installation.

With the adapter installed in the previous opening, the inflatable bladder/bag with the attached air valve body is inserted into the boat, and after securing the valve body to the installed adapter, the internal bladder may then be inflated. When originally installed, or for any subsequent replacement bladder/bag used for a later repair, this bladder/bag may be longitudinally rolled up and inserted into a perforated plastic film packaging/bag of a small diameter and the required length. The design and use of this packaging, including heat sealed pockets on each end which allow a collapsible tent pole/stick of the correct diameter to be used to push the bag into the boat through the installed adapter housing.

The outer protective film packaging is only used for protection of the inner bag/bladder for shipping and storage, and to maintain the small size needed for insertion through the adapter into the boat. Upon inflating the bag/bladder inside the boat or inflatable article, the outer perforated package is torn away to allow the bag to inflate fully. This inner bag/bladder after installation then becomes the air holding membrane, and from then on forward, the boats outer shell or fabric will only need to provide a tough and durable exterior for puncture resistance, and to maintain the desired shape of the craft from the air pressure held inside by the bag/bladder.

The inflatable bag/bladder can be made in any length or circumference, to accommodate for the different designs and length of boats. For example, manufacturer's produce varying diameters used for the tubes, and have anywhere from one, to as many as five separately sealed air chambers which prevent one puncture or leak, from deflating the entire craft. These features of the invention, allows the installation on any type of boat, regardless of the manufacturer, or design elements used to make the said craft or product.

In one aspect of the use of the invention, these features are used to retrofit existing boats that have been punctured or leak air, but does not preclude the use in a newly manufactured boat.

The benefits of this invention will be desired by the end user, whether installed at the time of manufacture, or when installed at a later date for the repair of an air leak or puncture.

When installed, this invention allows for the repair of an air leak or puncture, without the need for a time consuming or expensive glued on patch, which may or may not produce the outcome desired. Many leaks occur in these types of boats, with some through the seams, or a puncture which is so close to a seam, which makes a repair with a glued patch next to impossible. In this disclosure all reference to any of these types of structures, whether an inflatable raft, boat or other type of inflatable product, the generic term of boat craft or RIB, will be used to describe whichever type of structure.

This invention, and the benefits of the replaceable inner bag/bladder, is needed for these types of products. However, as these descriptions and subsequent drawings will show the preferred embodiments used in this invention, this does not preclude the scaling of the valve system and bag/bladder to fit much larger custom RIB's, boats or inflatable articles of any size. There are many designs which could lead to a practical solution, but the main aspect of this invention is a valve system, with a re-attachable bag/bladder, that will allow for the easy and simple repair of punctures or leaks in the future. After the installation of the adapter, air valve, and bladder system, for any future leak or puncture, the air valve structure is removed, a new inflatable bag/bladder with a new tightening nut and washer sealed inside is reattached to the air valve, then the new bag inserted into the boat and inflated after securing the air valve back to the previously installed adapter, these embodiments and features allow for an easy repair for future problems of air leaking through the outer skin. This system will allow quick and easy repair, whether from normal wear and tear, or from an unforeseen puncture due to the demanding circumstances which these craft endure and operate in on a regular basis.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1D provides a schematic perspective view from above inflatable boat.

FIG. 1E provides upper orthographic schematic perspective view of inflatable boat.

FIG. 1F provides a schematic perspective rear view of inflatable boat.

FIG. 1G provides schematic perspective view of side of inflatable boat.

FIG. 1H provides schematic detail view of inflatable boat.

FIG. 2 provides a schematic view of Halkey-Roberts adapter.

FIG. 3 provides a schematic section view of Halkey-Roberts adapter.

FIG. 4 provides a schematic view of Achilles Adapter.

FIG. 5 provides a schematic section view of Achilles Adapter.

FIG. 6 provides a top schematic view of other adapter.

FIG. 7 provides a upper orthographic schematic view of other adapter and mounting flange.

FIG. 8 provides a side schematic view of other adapter and mounting flange.

FIG. 9 provides a sectional side schematic view of other adapter and mounting flange.

FIG. 15 show a typical valve system with view of valve system and partial view of bag and packaging tube.

FIG. 16 provides the rear partial view of typical embodiment with attached bag inside packaging tube.

FIG. 17 provides the front partial sectional view of typical valve system with attached bag inside packaging tube.

FIG. 18 provides partial side view of valve system with attached bag and packaging tube.

FIG. 19 is a upper schematic view of another embodiment of main body using a rigid air valve for air sealing.

FIG. 20 provides a schematic side view of the rigid air valve embodiment.

FIG. 21 is a sectional schematic view or the rigid air valve embodiments with parts labeled 22 through 26.

DETAILED DESCRIPTION OF THE INVENTION

Figure 1A:
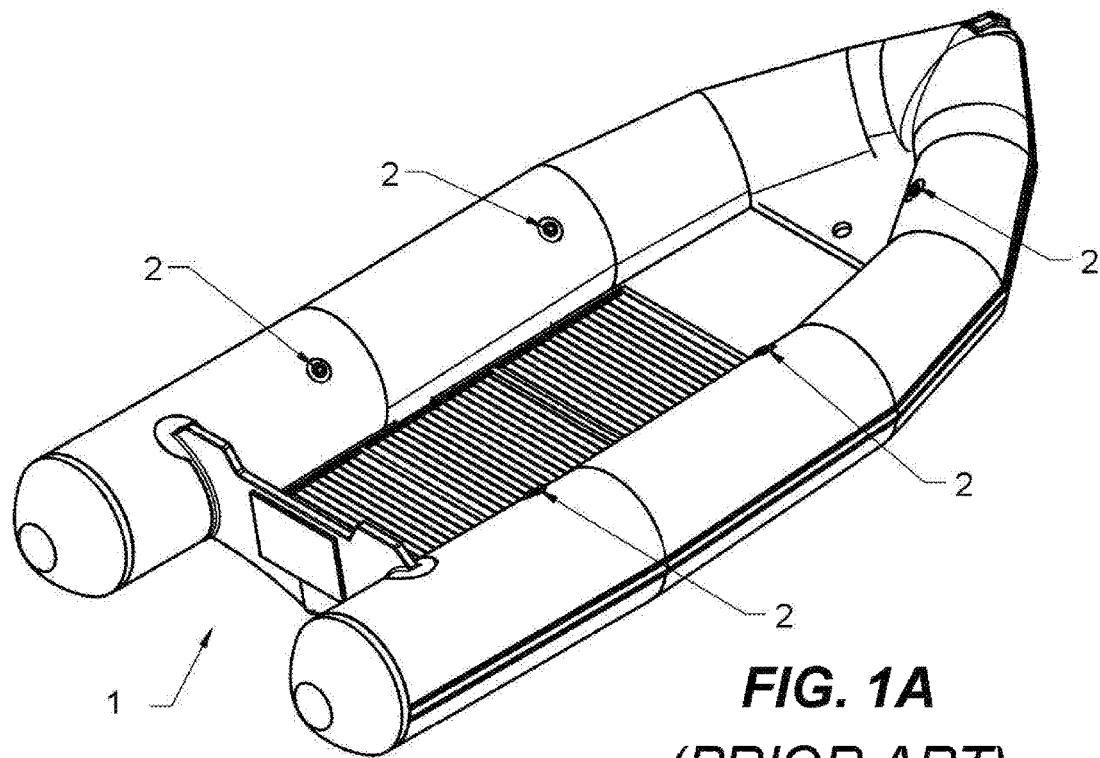
FIG. 1A provides a schematic perspective view from above a typical inflatable boat.
Figure 1B:
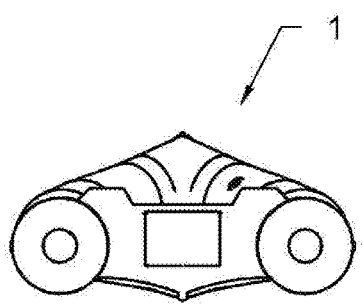
FIG. 1B provides a schematic perspective rear view of inflatable boat.
Figure 1C:
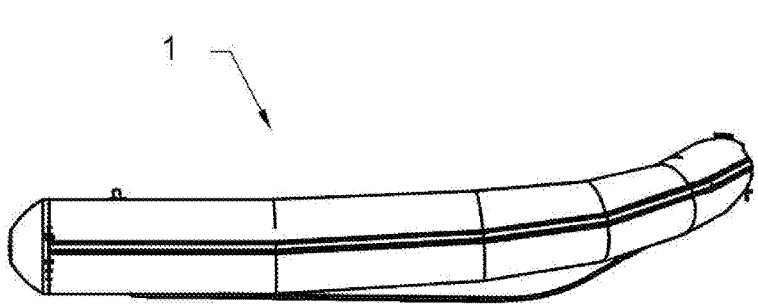
FIG. 1C provides a schematic perspective view from the side of said inflatable boat.

FIGS. 1D through 37 show the preferred embodiments of the valve system, with adapters and the individual parts used in this invention. FIGS. 2, 4, and 6 show the adapters used to connect this valve system to the previously installed air valves used at the time of construction of any inflatable type boat. These adapters, FIGS. 2 and 4, allow for the attachment of this invention, in the same way as the air previous valves were attached, simply and without altering the boat or structure in any way. FIG. 2 shows a type of adapter 6 that is screwed into the previously attached air valves lightening nut, which is left inside the boat after disassembly and removal of the outer part of said valve. A second type of adapter 8, as shown in FIG. 4 merely screws into threaded flange mounted on the boat, after the removal of the air valve installed at the time of manufacture. FIG. 6 shows another embodiment of this invention, the adapter 10 including tightening flange 11, which will allow attachment of this invention to boats that use too smell a valve opening, or of a design that precludes easy and simple attachment of this system instead of the previous valve. With this adapter 11 from FIGS. 6 and 7, it allows this invention to be compatible with any other type valve mountings used by tire separate manufacturer's, because of their small size or incompatible features of the valve used at tune of manufacture. The type boats that will use adapter 11, from FIG. 6, must be altered slightly to attach this type adapter. This will be accomplished by unscrewing or disassembly of the previous valve, then making small slits on either side of the hole, in the preferred later mounting direction, to remove any leftover valve parts inside the boat. These slits also allows the adapter 10 from FIG. 6, to be inserted in through the opening of the previous air valve hole, and attached to the adapter mounting flange 11 with screws or other means (ex. rivets, bolts, etc.). The installer will need to punch holes that lineup with the screw openings of tins adapter 10, to make it easier to line up and assemble with the mounting flange 11 from FIG. 7. All the adapters in FIGS. 2, 4, and 6, have the same internal features and size, to allow either the main body umbrella valve 16 from FIG. 10, or rigid air valve main body 24 from FIG. 19, to be securely attached to any of the adapters 6, 8, or 10. These adapters 6, 8, and 10 allow this invention and valve system, to be easily installed into any type or manufacture of inflatable boat, regardless of the previous type or make of valve installed at time of manufacture. The adapters from FIGS. 2 and 4 are the corresponding parts to the air valves used in many boats, and have passed their patent protections due to the age of these designs. Even though only listing three adapters in this system, this does net preclude the manufacture of more than these three specific ones, as new air valve designs come to market, or older designs lose their patent protections, if applicable. The two adapters in FIGS. 2 and 4 are the most widely used air valves in inflatable products, with many of the largest manufacturer's using one or the other type.

Figure 10:
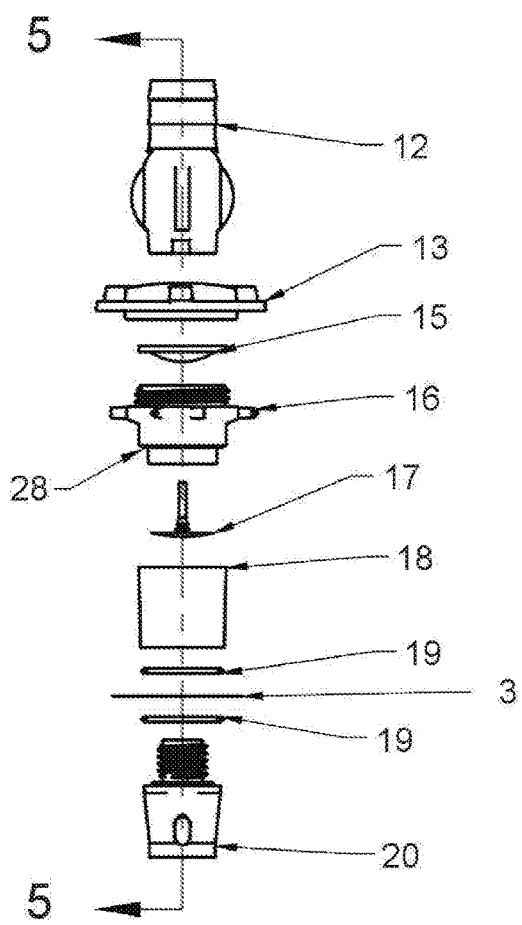
FIG. 10 provides a expanded schematic view of parts 12 through 20.

The preferred embodiment of the valve system of this invention, with the individual parts shown separately and numbered 12 through 20, is shown in FIG. 10. This embodiment of the valve system will consist of a main body umbrella valve 16, which has a hole on center to receive and retain the umbrella valve 17, and surrounding inlet air holes. In this embodiment of this valve system, file umbrella valve 17 is the one way valve which holds air inside the bag/bladder 3. The lower body 18 is glued or high frequency welded to the umbrella main body 16, after the umbrella valve 17, is installed in its place. The lower body 18 and tire thumb screw 20, with rubber washers 19 on either side of the inflatable bag/bladder 3, are what clamps together and holds air tight this bag/bladder 3, when in use and installed in the boat or article.

The features of this system allow either of the main bodies 16 or 24 after installation of appropriate internal valve parts, and subsequent weld or attachment to lower body 18, and secured to bag/bladder 3 with washers 19 and thumb screw 20, to be easily removed and subsequently reinstalled, after cutaway of the previously installed but newly leaking bag/bladder 3, whichever adapters 6, 8, or 10 are installed in the inflatable boat 1. The embodiment and design in this system, is accomplished with three evenly spaced axially tapered tabs best seen in FIG. 19. These tabs, when either main body 16 or 24 is inserted into and rotated inside any of the adapters 6, 8, or 10, have corresponding shape that mates with all the adapters to hold and lock the entire assembly during use inside of any inflatable boat 1 or device. There are multiple ways to accomplish this same embodiment or feature with sufficient strength, but this embodiment must be accomplished with a minimum of axial rotation, or the bag/bladder 3 would become twisted inside the boat before inflation. As shown in FIGS. 12 through 18, the threaded thumb screw 20, allows a new longitudinally rolled and packaged bag/bladder 3 to be easily threaded and re-connected to the lower body 18. After the packaged bag/bladder 3 as shown in FIGS. 15 through 18, is reinserted into the inflatable boat 1 and attached and held fast to whichever adapter is installed, only inflation is needed to complete the repair. Anew thumb screw 20, with elastomer washer 19 attached, must be sealed inside of the new replacement bag/bladder 3, to facilitate later reattachment to the lower body 18.

As seen in FIGS. 19 through 21, another embodiment of this valve system, with individual parts labeled 22 through 26 as shown, is an alternate type air valve arrangement for this invention, with advantages provided but at a higher complexity aid cost. This embodiment allows a hermetic seal between the rigid air valve 22, with bodily held elastomer washer 25 which opposes the kinetic energy provided by the spring 26 and makes a forcible seal against the lower shape of the rigid valve main body 24. The air valve cap 23, also opposes the force provided by the spring 26, aid has a designed upper shape that allows a common flat or Phillips screwdriver, or even a coin, to be used to push in and lock open the air valve 22, for deflating. This open position is facilitated by the bump on the air valve labeled 27, as seen in FIG. 21, which when the air valve 22 is pushed in, rotated and released, tins bump holds against the bottom of the tabs of main body 24, which support the spring 26 and center the rigid air valve 22 in place. Held open in this position, the inflatable boat 1 can be deflated by many OEM supplied air pumps or with any shop type vacuum cleaner, to deflate the boat for storage or stowage on-board of a larger vessel when desired.

This rigid valve main body 24, along with the umbrella main body 14, shown and described earlier in FIG. 10, share embodiments, features, and size which make them interchangeable with adapters 6, 8 or 10. These features allow either type of valve to be used in this invention, with any chosen or needed adapter. Both main bodies 16 and 24 have the same mating surfaces needed to ultrasonically weld to lower body 18 as previously mentioned, or another embodiment of lower body 29, as seen in FIGS. 22 through 25. This alternate type lower body 29, not only ultrasonically welds to either main body 14 or 24, but also allows an ultrasonic weld to the bag/bladder 3. An ultrasonic weld initiator 28, as seal in FIGS. 11 and 21, which is an embodiment of both main bodies, allows a hermetic seal between both main body 16 or 24, and either lower body 18 or 29.

Figure 11:
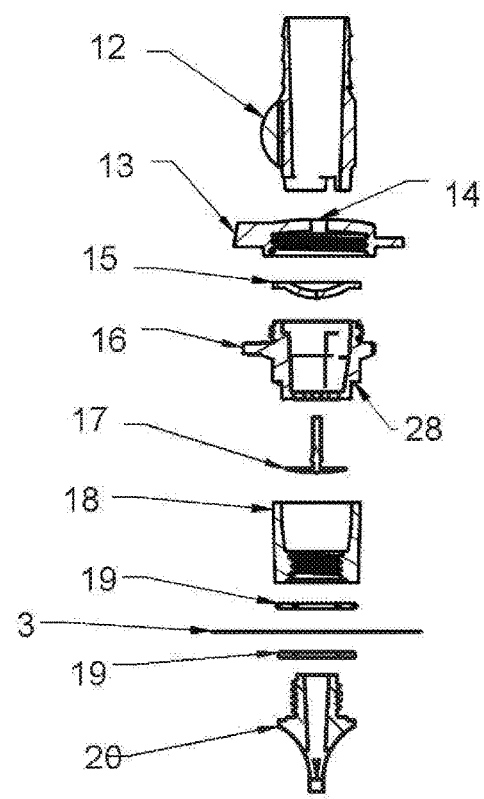
FIG. 11 provides a expanded sectional schematic view of parts 12 through 20.
Figure 12:
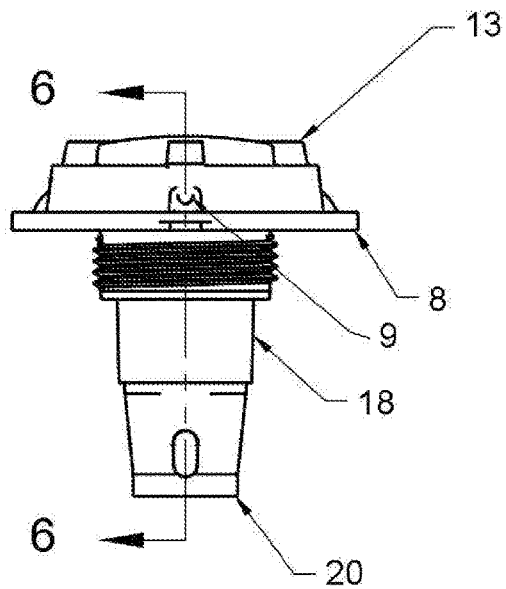
FIG. 12 provides a side schematic view of embodiment of valve system.
Figure 13:
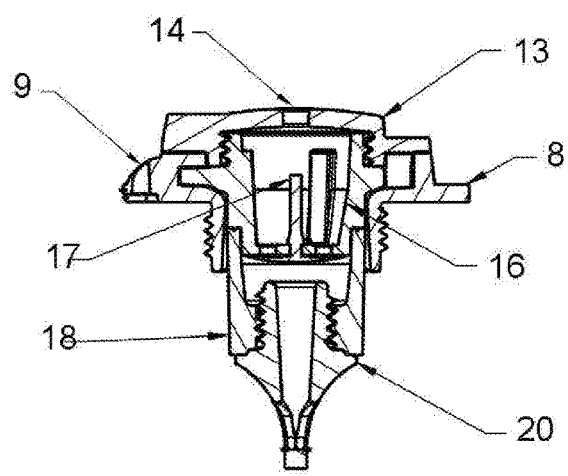
FIG. 13 is a sectional schematic view of a typical embodiment of this invention.
Figure 14:
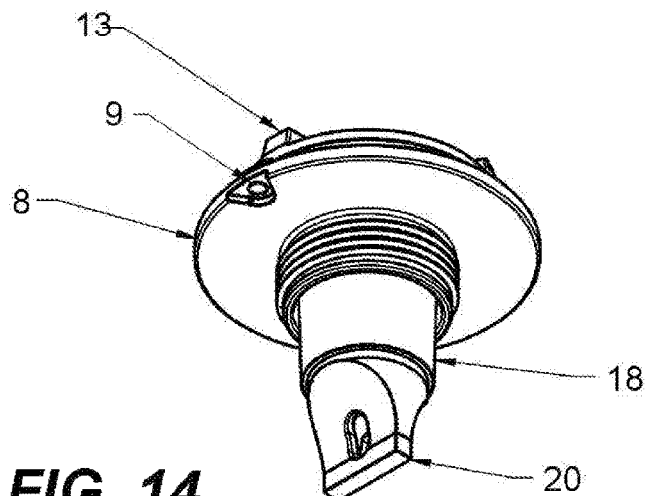
FIG. 14 provide a lower perspective view of typical valve system.
Figure 22:
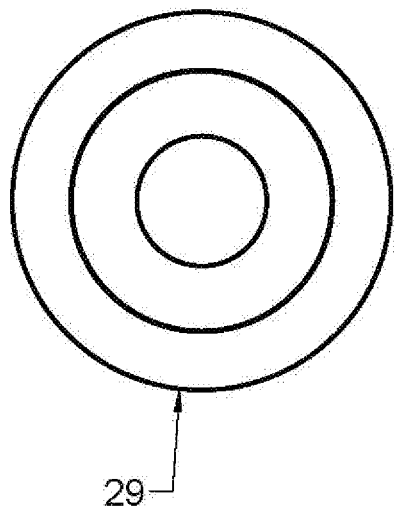
FIG. 22 provides the top schematic view of another embodiment of lower body.
Figure 23:
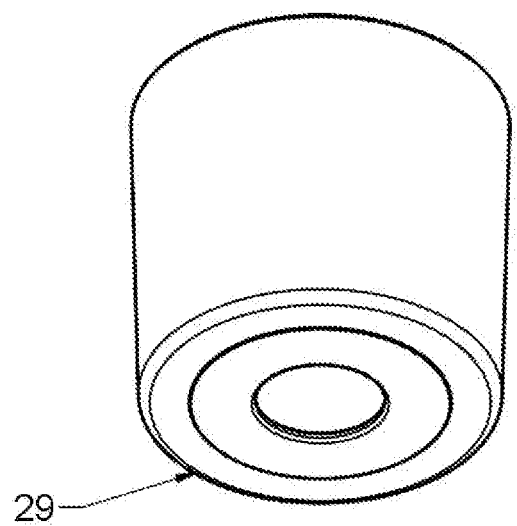
FIG. 23 is a lower perspective view of showing alternate lower body.
Figure 24:
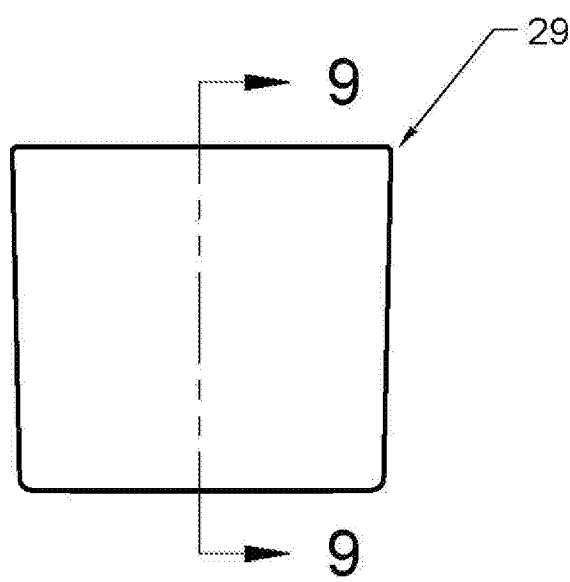
FIG. 24 is side view of lower body that allows ultrasonic weld to main bodies and also bag.
Figure 25:
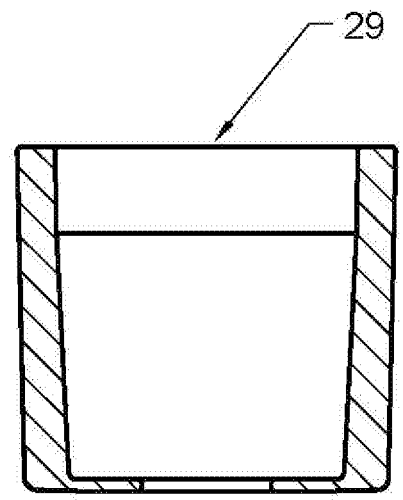
FIG. 25 provides a schematic sectional view of alternate embodiment of lower body.
Figure 26:
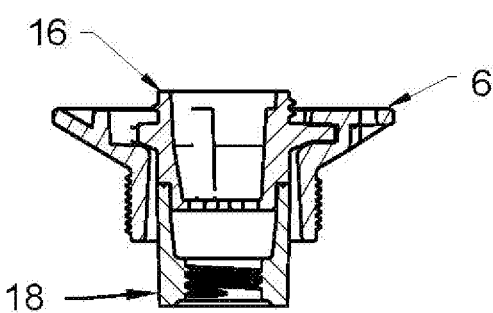
FIG. 26 is a schematic sectional view showing adapter 6, main body 16, and lower body 18.
Figure 27:
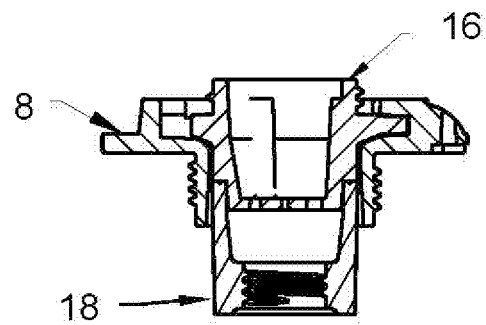
FIG. 27 is a schematic sectional view showing adapter 8, main body 16, and lower body 18.
Figure 28:
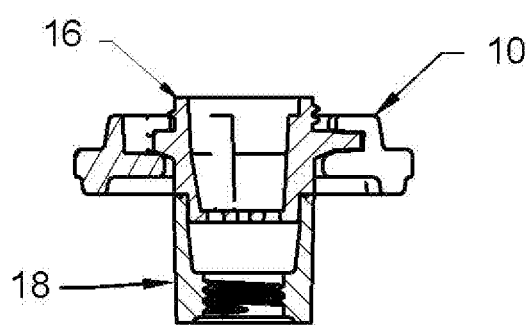
FIG. 28 is a schematic sectional view showing adapter 10, main body 16, and lower body 18.
Figure 29:
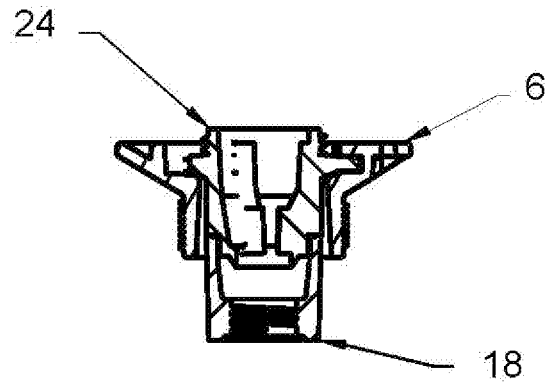
FIG. 29 is a schematic sectional view showing adapter 6, main body 24, and lower body 18.
Figure 30:
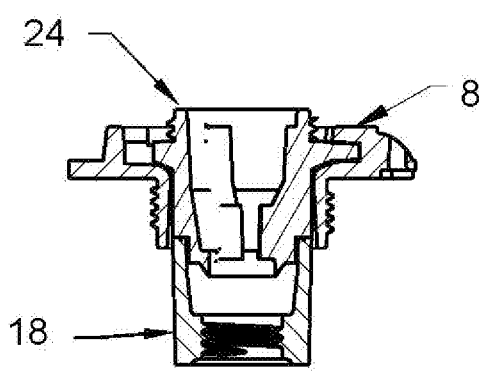
FIG. 30 is a schematic sectional view showing adapter 8, main body 24, and lower body 18.
Figure 31:
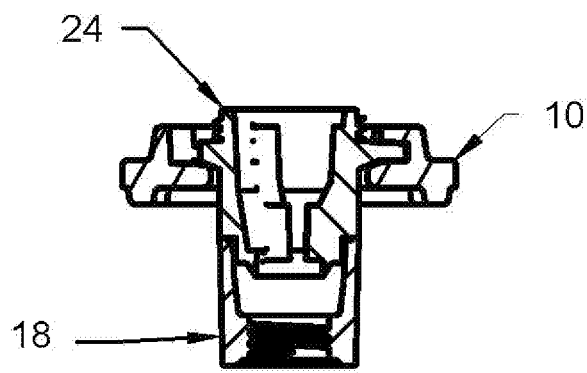
FIG. 31 is a schematic sectional view showing adapter 10, main body 24, and lower body 18.
Figure 32:
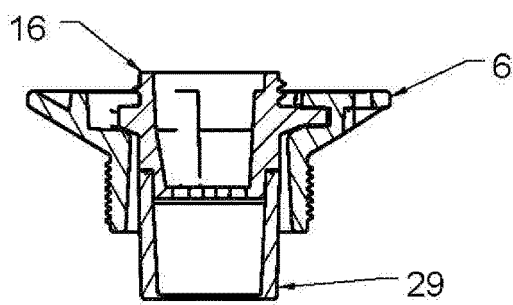
FIG. 32 is a schematic sectional view showing adapter 6, main body 16, and lower body 29.
Figure 33:
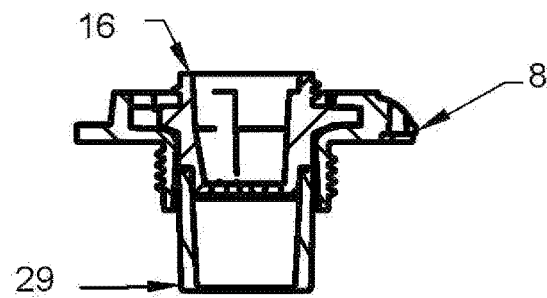
FIG. 33 is a schematic sectional view showing adapter 8, main body 16, and lower body 29.
Figure 34:
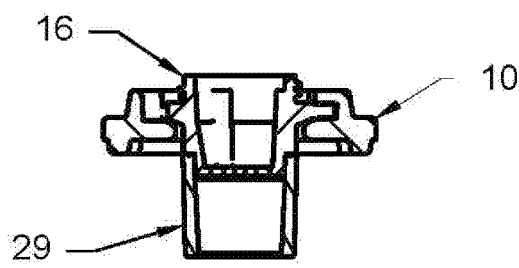
FIG. 34 is a schematic sectional view showing adapter 10, main body 16, and lower body 29.
Figure 35:
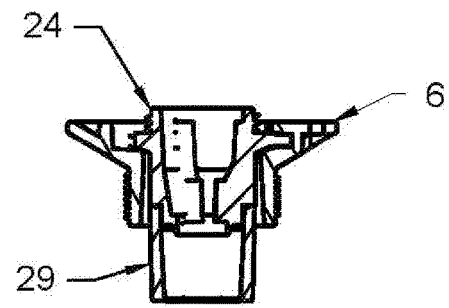
FIG. 35 is a schematic sectional view showing adapter 6, main body 24, and lower body 29.
Figure 36:
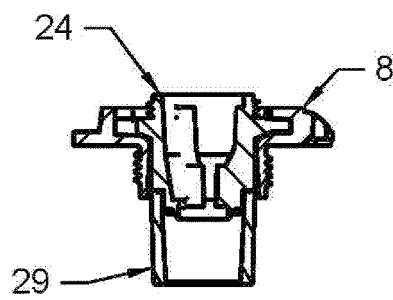
FIG. 36 is a schematic sectional view showing adapter 8, main body 24, and lower body 29.
Figure 37:
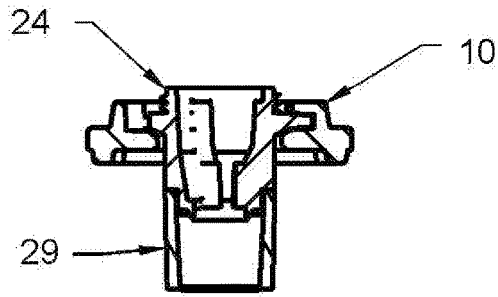
FIG. 37 is a schematic sectional view showing adapter 10, main body 24, and lower body 29.

The other parts of this embodiment not previously mentioned include the cap 13, shaped elastomer washer 15, and tool 12 as seen in FIGS. 10 and 11. The cap 13, screws onto either the main body 16 or 24, and the installation of elastomer washer 15 provides extra protection of holding air inside the bag/bladder 3 even though there is a hole 14 in the top of the cap 13, as shown in the sectional view FIG. 11 through line 5-5 from FIG. 10. The hole 14 in the cap 13, along with a corresponding holes 7 and 9 in adapters 6 and 8, allow a short thin cord or lanyard to secure the cap B to whichever adapter is used. This resolves concerns for loss or misplacement of the cap 13, while in use or when removed to re-inflate the boat's individual tube sections. As in some installations, these valves are over the water, with the ever-present danger of the cap 13 being dropped or lost if not attached to the boat in any way.

The tool 12, with complementary notches and mating surfaces to either of the main bodies 16 or 24, allows the application of necessary torque for initial tightening of the adapters, and for locking and unlocking the valve assembly when desired to facilitate the installation of a replacement bag/bladder 3 inside packaging tube 21. Secondly, by allowing the air pump provided as original equipment to be retrofitted for use with this system for inflation or deflation, when needed. The upper/top portion of the tool 12, which is designed to fit a hose for connection to any air pump, may be made in other sized outside diameters, required for the many different original equipment type pumps provided by the manufacturer's, when boat is sold to the end user. The lower portion of this tool 12 fits tightly inside either main body 16 or 24, to hold tight and provide the necessary seal needed for inflation.

Thus, in summary, the inflatable air bag/bladder and valve system of my invention, when installed inside of an inflatable boat or raft, allows for the repair of air leakage or punctures in a simple and efficient manner. After the initial installation, if a puncture or leak occurs at any later date, this system allows for a replacement bag/bladder to be subsequently reinstalled whenever needed. It is easily retrofitted to any type of previous valve system used by different manufacturers of boat, rafts or articles, with little to no modification needed to install or retrofit into said leaking boat, raft, or inflatable article. With this new valve system and inflatable bag/bladder installed, each of the separate air chambers can be easily repaired by the end user at a later date, when an air leak or puncture are found through normal use of the inflatable boat without the cost or time necessary for a glued on patch to fully cure.

PARTS LIST

1) Inflatable Boat
2) Original Equipment Valves installed in Boat 1 or Inflatable Device
2A) An embodiment of valve system of this invention
3) Replaceable Inner Bag/Bladder
4) Original Hull/Outer Flexible Hull Material
5) Typical Divider/Baffle inside tubes to separate inner tube sections
6) Halkey/Roberts Type Air Valve Adapter
7) Hole in H/R adapter 6 to attach Lanyard/Line for loss prevention
8) Achilles Type Air Valve Adapter
9) Hole in Ach adapter 8 to attach Lanyard/Line for loss prevention
10) Other Adapter
11) Other Adapter Washer Flange which screws/attaches to Inflatable Boat 1 with Other Adapter 11
12) Tool
13) Cap
14) Hole in Cap 13 to allow attachment of line or lanyard for loss prevention
15) Shaped Elastomer Washer
16) Main Body Umbrella Valve
17) Umbrella Valve
18) Lower Body
19) Elastomer Washer
20) Thumb Screw
21) Perforated Packaging Tube
22) Rigid Air Valve
23) Air Valve Cap
24) Main Body Air Valve
25) Elastomer Washer
26) Spring
27) Bump on Rigid Air Valve to allow to lock in Open Position
28) Ultrasonic Weld Initiator to allow either Main Body 16 or 24 to attach to either Lower Body 18 or 29.
29) Another embodiment of Lower Body to allow an ultrasonic weld to either Main Body 16 or 24, and also an ultrasonic weld to Bag/Bladder 3
30) Adhesive as alternative to Packaging Tube 21

In view of the foregoing, it should be clear that numerous changes and variations can be made without exceeding the scope of the inventive concept outlined. Accordingly, it is to be understood that the embodiment(s) of the invention herein described is/are merely illustrative of the application of the principles of the invention. Reference herein to details of the illustrated embodiment(s) is not intended to limit the scope of the claims, which recite those features regarded as essential to the invention

I claim:

1. An inflatable bladder system for use with inflatable devices having a device valve comprised of an outer valve body connected to a removable inner valve core, which device valve is used for filling, emptying and retaining air within an inflatable void in said inflatable device, comprising:
    an inflatable bladder conforming to the inflated shape of said inflatable void in said inflatable device when said inflatable bladder is inflated; and
    wherein said inflatable bladder is compacted and insertable through the outer valve body of said device valve into the inflatable void in said inflatable device for positioning therein prior to inflation of said inflatable bladder.

2. The system of claim 1, wherein said inflatable bladder has a bladder valve for filling, emptying and retaining air within said inflatable bladder.

3. The system of claim 2, wherein said bladder valve connects to the device valve for filling, emptying and retaining air within said inflatable void in said inflatable device.

4. The system of claim 2, wherein said bladder valve replaces said inner valve core and connects to said outer valve body in order to connect to said device valve.

5. The system of claim 3, wherein said bladder valve replaces said inner valve core and connects to said outer valve body in order to connect to said device valve.

6. The system of claim 2, wherein connection of the bladder valve to the device valve anchors the inflatable bladder in a position to conform to the shape of the inflatable void when the bladder is inflated.

7. The system of claim 3, wherein connection of the bladder valve to the device valve anchors the inflatable bladder in a position to conform to the shape of the inflatable void when the bladder is inflated.

8. The system of claim 4, wherein connection of the bladder valve to the device valve anchors the inflatable bladder in a position to conform to the shape of the inflatable void when the bladder is inflated.

9. A method for using an inflatable bladder system for repair of an inflatable device having a device valve comprised of an outer valve body connected to a removable inner valve core, which device valve is used for filling, emptying and retaining air within an interior inflatable void in said inflatable device, comprising:
providing an inflatable bladder conforming to an inflated shape of the interior inflatable void in said inflatable device when said inflatable bladder is inflated, which inflatable bladder has a bladder valve for filling, emptying and retaining air within said inflatable bladder, and which inflatable bladder can be compacted to insert through the outer valve body of said device valve into the inflatable void in said inflatable device;
compacting and inserting said compactable inflatable bladder through the device valve into the interior inflatable void in said inflatable device; and
inflating said inflatable bladder via its bladder valve so that said inflatable bladder fills and fully inflates said inflatable void, and closing off said bladder valve so as to retain air within said bladder valve and inflatable void.

10. The method of claim 9, wherein said bladder valve can be connected to the device valve for filling, emptying and retaining air within said inflatable void in said inflatable device, said method further comprising connecting said bladder valve to the device valve.

11. The method of claim 10, wherein connecting said bladder valve to said device valve includes removing said inner valve core from said outer valve body and replacing it with said bladder valve.

12. The method of claim 10, wherein connection of the bladder valve to the device valve anchors the inflatable bladder in a position to conform to the shape of the inflatable void when the bladder is inflated.

13. The method of claim 11, wherein connection of the bladder valve to the device valve anchors the inflatable bladder in a position to conform to the shape of the inflatable void when the bladder is inflated.

14. The system of claim 1, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

15. The system of claim 2, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

16. The system of claim 3, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

17. The system of claim 4, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

18. The system of claim 5, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

19. The system of claim 6, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

20. The system of claim 7, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

21. The system of claim 8, wherein said inflatable bladder is retained M a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

22. The method of claim 9, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

23. The method of claim 10, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

24. The method of claim 11, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

25. The method of claim 12, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

26. The method of claim 13, wherein said inflatable bladder is retained in a compacted configuration for insertion through said device valve into the inflatable void in said inflatable device by an expansion restraint, which expansion restraint will maintain said inflatable bladder in a compacted configuration only until the expansion of said bladder by inflation releases it from said expansion restraint.

27. The system of claim 14, wherein said expansion restraint is at least one of: non-permanent adhesive between compacted portions of said inflatable bladder, and at least one burstable external wrap around portions of said compacted inflatable bladder.

28. The system of claim 15, wherein said expansion restraint is at least one of: non-permanent adhesive between compacted portions of said inflatable bladder, and at least one burstable external wrap around portions of said compacted inflatable bladder.

29. The system of claim 16, wherein said expansion restraint is at least one of: non-permanent adhesive between compacted portions of said inflatable bladder, and at least one burstable external wrap around portions of said compacted inflatable bladder.

30. The system of claim 17, wherein said expansion restraint is at least one of: non-permanent adhesive between compacted portions of said inflatable bladder, and at least one burstable external wrap around portions of said compacted inflatable bladder.

31. The system of claim 18, wherein said expansion restraint is at least one of: non-permanent adhesive between compacted portions of said inflatable bladder, and at least one burstable external wrap around portions of said compacted inflatable bladder.

32. The system of claim 19, wherein said expansion restraint is at least one of: non-permanent adhesive between compacted portions of said inflatable bladder, and at least one burstable external wrap around portions of said compacted inflatable bladder.

33. The system of claim 20, wherein said expansion restraint is at least one of: non-permanent adhesive between compacted portions of said inflatable bladder, and at least one burstable external wrap around portions of said compacted inflatable bladder.

34. The system of claim 21, wherein said expansion restraint is at least one of: non-permanent adhesive between compacted portions of said inflatable bladder, and at least one burstable external wrap around portions of said compacted inflatable bladder.

35. The method of claim 22, wherein said expansion restraint is at least one of: non-permanent adhesive between compacted portions of said inflatable bladder, and at least one burstable external wrap around portions of said compacted inflatable bladder.

36. The system of claim 23, wherein said expansion restraint is at least one of: non-permanent adhesive between compacted portions of said inflatable bladder, and at least one burstable external wrap around portions of said compacted inflatable bladder.

37. The method of claim 24, wherein said expansion restraint is at least one of: non-permanent adhesive between compacted portions of said inflatable bladder, and at least one burstable external wrap around portions of said compacted inflatable bladder.

38. The method of claim 25, wherein said expansion restraint is at least one of: non-permanent adhesive between compacted portions of said inflatable bladder, and at least one burstable external wrap around portions of said compacted inflatable bladder.

39. The method of claim 26, wherein said expansion restraint is at least one of: non-permanent adhesive between compacted portions of said inflatable bladder, and at least one burstable external wrap around portions of said compacted inflatable bladder.

* * * * *